3,080,334
METHOD OF INCREASING THE PARTICLE SIZE AND SOLIDS CONTENT OF SYNTHETIC RUBBER LATEX
Mitchell S. Kolaczewski and Richard W. Hobson, Akron, and James J. Hamill, Cuyahoga Falls, Ohio, assignors to The Goodyear Tire & Rubber Company, Akron, Ohio, a corporation of Ohio
No Drawing. Filed Dec. 4, 1959, Ser. No. 857,272
17 Claims. (Cl. 260—29.7)

This invention relates to the manufacture of a high solids synthetic rubber latex having improved colloidal properties and particularly to a 65 to 70% solids latex having a visoscity of less than 2,000 cps. and a rubber hydrocarbon content of not less than about 94%, and an increased average particle size and particle size distribution.

It is known that in the preparation of synthetic rubber high solids latices by the emulsion polymerization of butadiene-1,3 or mixtures thereof with other polymerizable compounds capable of forming copolymers therewith, the average size of the particles of these latices which may vary from about 1,500 A. to 2,500 A. is much smaller than the average size of the particles of natural rubber latex which is about 7,500 A. The extreme smallness of these synthetic rubber latex particles has made it extremely difficult to apply synthetic latex to many of the established practices that utilize natural rubber latex because the total solids of these latices is limited to slightly over 60% at a viscosity of about 2,000 cps. and the extremely large surface presented by the small particles in a synthetic latex requires large amounts of surfactant to stabilize the latex. The presence of large amounts of surfactant is detrimental to the use of these latices, particularly in the formation of films and foams therefrom. The smallness of the size of the synthetic rubber particles during ionic coagulation or electrodeposition promotes the formation of extremely thin films under dipping operations. Also, greater difficulties arise in concentrating these small particle size synthetic rubber latices by evaporation, creaming, or centrifuging. Thus, it becomes desirable to produce a synthetic rubber latex having an average particle size approaching that of Hevea latex, commonly known as natural rubber latex.

Many attempts have been made to increase the average particle size of synthetic rubber latices. These include (1) the use of certain ionizable water-soluble salts such as ammonium chloride or ammonium acetate in combination with formaldehyde as well as an adjustment in the pH of the latex being treated; (2) by heat treatment of the latex having a lowered pH; (3) by the desolvation treatment of the latex by the use of a water-miscible solvent such as acetone; (4) by treatment with a hydrophobic solvent as benzene, butadiene, toluene, or styrene; (5) by treatment of the latex with organic acids; (6) by freezing and thawing and/or refreezing and rethawing the latex; (7) by chilling the latex without freezing in the presence of an agglomerating aid such as sodium caprylate; (8) by the incremental addition of dispersing agents during the course of the reaction at such a rate that its concentration is maintained within a certain desired range; and (9) by the incremental addition of polymerizable monomer during the course of the reaction. Each of these methods for producing a large particle size synthetic rubber latex posesses disadvantages including the presence of undesirable additives which reduce the purity of the latex, or require long reaction periods and expensive equipment and hazardous materials, all contributing to an uneconomical and a difficultly reproducible process.

It is accordingly an object of this invention to provide a method for increasing the size of the particles of synthetic rubber in a synthetic rubber latex in such a manner as to produce a stable latex having a high percentage of rubber hydrocarbon and having fluidity characteristics comparable to natural rubber latex generally in the range of less than about 2,000 centipoises at about 68% solids and being particularly useful in the manufacture of foamed rubber cushioning material. It is a further object of this invention to provide a synthetic rubber latex which may be processed in substantially the same manner in which natural rubber is processed in the manufacture of foamed rubber products. A still further object of this invention is to make a synthetic rubber latex, the rubber particles of which approach the colloidal properties of natural rubber latex, without the use of the addition of chemicals and similar foreign substances which because of their presence interfere with the physical properties or processing of the resulting latex.

A part of the mechanism of aqueous emulsion polymerization may be explained in terms of the surfactant. After the critical micelle concentration has been reached at which time the surface tension of the system is at a minimum and the monomer is subdivided into droplets of a certain size distribution brought about by agitation with, for example, a marine propeller and stabilized with a surfactant such as a soap, for example potassium oleate, the remaining soap forms micelles which then solubilize the monomer from the droplets and become the chief locus of initiation. Polymerization is initiated in the micelle by a free radical. The micelles function to supply soap to the newly formed polymer which in turn becomes swollen with monomer and becomes a latex particle. These latex particles are stabilized against coagulation by the presence of soap on their surface. When between about 10 to 20% of the monomer is converted to polymer and in turn to latex particles, substantially all of the micelles have disappeared and the rate of polymerization will be dependent upon the number of latex particles formed. These latex particles are now the chief locus of propagation where the monomer is converted to polymer.

Under conventional conditions of emulsion polymerization using a high water and soap recipe, the monomer-swollen particles continue to form polymer until at least 70% of the monomer is converted to polymer, thereby forming in most cases difficultly deformable latex particles which cannot be agglomerated. Under these conditions where the particle size distribution of the latex is in the range of from about 500 A. to 1,500 A., a concentration of the latex to a solids content of from about 40% to 60% produces a very viscous latex with a viscosity well above 5,000 cps. and a polymer hydrocarbon content of not more than about 91% to 94%.

It has now been discovered that large size latex particles may be prepared by polymerizing a polymerizable monomer capable of producing a rubbery polymer in which the monomer is soluble in an emulsion polymerization system containing about 50 to about 150 parts of water per 100 parts of monomer, a surfactant capable of forming micelles, and a polymerization catalyst capable of producing free radicals, at a polymerization temperature of about 40° F. to about 85° F. by dispersing the monomer and enough surfactant in the water to form enough micelles to promote the conversion of monomer to polymer at a rate of at least 2% per hour during up to at least 40% conversion of the monomer to latex particles and enough to stabilize the latex particles against coagulation during the conversion period but insufficient to prevent the surface tension of the system from passing through a maximum value to a lower value. At the maximum value the surface of the latex particles has become depleted of surfactant to a point where the particles readily agglomerate when the monomer-swollen latex particles are mechanically treated as by agitation and causing a severe reduction in surface tension to a much lower value when at least 40% of monomer has been converted to polymer. Unreacted monomer is then removed from the agglomerated latex and the resulting latex may be concentrated to at least 68% solids having a viscosity of about 2,000 cps. or less and a polymer hydrocarbon content of at least 94%.

More specifically it has been discovered for the first time that a butadiene/styrene synthetic rubber latex having a high polymer hydrocarbon and high solids content with a low viscosity may be produced in an emulsion system of the character described above by subdividing the monomer into droplets of such a size that less than 3 parts of a surfactant such as potassium oleate may be successfully used to bring about the conversion of between about 40% to about 60% of the monomer to polymer while at the same time stabilizing the resulting latex against coagulation but only to such a degree as to permit the surface tension of the system to increase from an initial minimum value of between about 27 to 35 dynes per centimeter to a maximum of between about 50 to 70 dynes and then to a substantially constant minimum value when at least 40% of the monomer has been converted to polymer. At a surface tension of about 60 dynes, the surface of the latex particles is only about 35 to 45% covered with surfactant at which time the particles may be made to rapidly agglomerate as the system is mechanically disturbed as by agitation. As agglomeration proceeds to completion, the surface tension of the system drops sharply to a value of about 27 to 32 dynes and may increase 5 to 10 dynes during the remainder of the reaction. The average particle size of a rubbery styrene/butadiene latex prepared in this manner approaches 3,000 A. to 4,500 A.

If the initial distribution of soap is not made within certain critical limits so that enough micelles are present to permit the rapid conversion of monomer to latex particles at a rate of at least 2% per hour, particularly with respect to the formation of a styrene/butadiene rubbery copolymer, then the monomer-swollen latex particles will either be unstable early in the polymerization reaction causing undesirable agglomeration or coagulation of the system before economically minimum amounts of monomer are converted to polymer; or the monomer-swollen latex particles will pass beyond their ability to agglomerate because sufficient soap was present throughout the polymerization reaction to stabilize the system against agglomeration even when the system was acted upon mechanically as by stirring.

Other properties of the latex of this invention in addition to the size of the particles are described as follows:

|  |  | Preferred |
| --- | --- | --- |
| Total Solids, percent | 65 to 75 | about 68 to 70. |
| pH | 9.2 to 11.0 | about 10. |
| Turbidity | 2 to 4 |  |
| Surface Tension (dynes/cm.) | 29 to 45 | 32. |
| Gel (percent) | 0 to 20 | 0. |
| Rubber Hydrocarbon Content, percent | 94 to 96 | 96. |
| Mooney Plasticity of Polymer (M/L-4) | 100 to 150 | 140. |

Examples of polymerizable monomeric compounds that may be used in making large size polymer particles according to the process of this invention are a conjugated diene hydrocarbon such as butadiene-1,3; methyl-2-butadiene-1,3 (isoprene); chloro-2-butadiene-1,3 (chloroprene); 2,3-dimethyl-butadiene-1,3; 2-ethyl-butadiene-1,3; 1,4-dimethyl-butadiene-1,3; hexadiene-2,4; pentadiene-1,3; 3-methyl-pentadiene-2,4; piperylene; or the like either alone or in admixture with each other or in less or equal amounts of one or more monoethylenic compounds copolymerizable therewith in aqueous emulsion, such as acrylonitrile, methacrylonitrile, alpha-chloro-acrylonitrile, and similar acrylic nitriles; styrene, vinyl toluene, vinyl naphthalene, parachloro-styrene, and similar aryl olefines and substituted aryl olefines; methyl acrylate, methyl methacrylate, acryl amide, and similar esters and amides of acrylic acids; methyl isopropenyl ketone, methyl vinyl ketone, vinylidene chloride, isobutylene, methyl vinyl ether, the alpha methylene carboxylic acids and their esters, and other compounds containing a single ethylenic double bond which are copolymerizable with butadiene-1,3 hydrocarbons in aqueous emulsion. The present invention is of particular significance in the preparation of the commercial synthetic rubbers known as neoprene (polymerized chloro-2-butadiene-1,3), SBR (copolymers of butadiene-1,3 and styrene), and ABR (copolymers of butadiene-1,3 and acrylonitrile).

Polymerization initiators useful in this invention include the well known types, particularly the peroxygen type compounds including the organic hydroperoxides such as para methane hydroperoxide, cumene hydroperoxide, diisopropyl benzene hydroperoxide, pinane hydroperoxide, hydrogen peroxide, benzoyl peroxide, ammonium persulfate, sodium perborate, potassium persulfate, potassium percarbonate, as well as other types of initiators such as diazamino benzene, dipotassium diazomethane disulfonate, and triphenyl methyl azomethane. Activators preferred in redox combination with the peroxygen type initiators mentioned above are heavy metal compounds such as simple ionizable heavy metal salts including ferrous sulfate, cobalt chloride, nickel nitrate, or the like. These activators exist in complex combination or are otherwise associated with some other material such as sodium or potassium pyrophosphate, tripotassium phosphate, sodium salts of ethylene diamine tetra-acetic acid, levulinic acids, glycine, cystine, beta mercaptoethanol, etc.

Any surfactant ordinarily employed in the emulsion polymerization of the foregoing polymerizable monomers and which will form micelles may be used. Examples of surfactants are fatty acids soaps such as sodium laurate, sodium myristate, sodium palmitate, soaps from fatty acids of tall oil, sodium oleate, and particularly potassium oleate or mixtures thereof; alkali metal sulfates derived from fatty alcohols containing at least 10 carbon atoms such as sodium lauroyl sulfate, potassium myristyl sulfate, and the like; alkali metal sulfonates derived from aryl sulfonic acids such as sodium naphthalene sulfonate, sodium isopropyl naphthalene sulfonate, sodium diisobutyl naphthalene sulfonate, sodium lauroyl benzic sulfonate, and the like; salts of high molecular weight organic bases such as cetyl trimethyl ammonium sulfate, the hydrochloride of diethyloleyl amide, and the like. Although these surfactants may be used in the present invention, some are more desirable than others because they produce a more facile, efficient, and economical process, particularly with regard to promoting a higher percentage conversion at the time the particles are being agglomerated. In order to produce a high polymer hydrocarbon content latex these surfactants should not be used in amounts greater than about 3 parts per 100 parts of monomer and the water should be present in amount between about 50 to 150 parts per 100 parts of monomer.

It is well known that the amount of surfactant required to maintain a dispersion of polymer particles in a stable condition without appreciable coagulation will range anywhere from about 20% to about 60% of the amount theoretically required to saturate the surface of the latex particles present in the reaction mixture at any given time. It is also known that latices in which the surface of the latex particles is completely covered with surfactant cannot be readily agglomerated. In the present invention it is most important to have only enough soap present in the system so that it may be used to permit the rapid conversion of monomer to polymer and stabilize the converted monomer up to an economical conversion level but insufficient to prevent agglomeration of the particles after the desired level of conversion has been reached.

For economical reasons in the manufacture of a butadiene/styrene high solids rubber latex, it is desirable that a conversion of about 40% be obtained before the system is subjected to agglomeration. If the system is allowed to go to a higher conversion level above about 60 to 70%, then agglomeration of the system without coagulation becomes almost impossible when using conventional equipment ordinarily used in making high solids butadiene/styrene rubbery copolymer latices.

The resulting latex prepared under the conditions described here may be concentrated by evaporation of unreacted monomer and water to solids approaching 70% and having a viscosity less than about 2,000 cps. and a polymer hydrocarbon content of 94 to 96%.

A typical low soap formulation that may be used in producing the large particle size high solids stable latex of this invention is as follows:

| Materials: | Parts (preferred range) |
|---|---|
| Monomer polymerizable to a rubbery polymer | 100. |
| Water | 50 to 150. |
| Soap (e.g. potassium oleate) | 1.0 to 2.5. |
| Catalyst-activator solution comprising— | |
| (1) A chelating agent such as Versene Fe-3 (sodium salt of ethylene diamine tetra-acetic acid) | 0.005 to 0.03. |
| (2) A source of iron such as ferrous sulfate heptahydrate, and | 0.001 to 0.03. |
| (3) Sodium formaldehyde sulfoxylate | 0.01 to 0.1. |
| Modifier (e.g. tertiary dodecyl mercaptan) | 0 to 0.3. |
| Electrolyte (e.g. tripotassium phosphate) | 0.0001 to 0.3. |
| Catalyst-initiator (e.g. diisopropyl benzene hydroperoxide) | 0.03 to 0.4. |
| Oxygen scavenger (e.g. sodium hydrosulfite) | 0.01 to 0.2. |

Temperature, 41° F. to 85° F.

The polymerization of these components may be conducted batch-wise or continuously. The polymerization conditions are conventional in all respects with the exception that the emulsion system contains certain components within certain narrow limits and the agitation of the system is controlled in such a manner as to bring about the desired latex particle sizes. Thus, the polymerization of the monomers used in making a rubbery polymer is conducted in the presence of the materials listed above which are all used for reasons well known in producing synthetic rubbers and latices. Under conventional procedures using large amounts of water and soap, the polymerization may take about 10 to 45 hours to produce a conversion of at least 70% and as high as 95% of monomer to polymer but, in the present invention where less than 3 parts of surfactant is used and the conversion is carried to as high a level as possible consistent with the ability of the particles to be advantageously agglomerated, it is desirable that the conversion be in the order of about 40% to 65% and be achieved at a rate of at least 2% per hour. The system approaches the critical soap to surface ratio and the surface tension increases to a maximum value at which time the latex particles are ready to agglomerate. When agglomeration occurs the surface tension decreases directly in proportion to the degree of agglomeration occurring. Under the conditions of the present invention agglomeration proceeds to a high degree as evidenced by the low surface tension of the final latex. It has been observed that agitation affects the point at which agglomeration occurs. However, considerable shifting of the agglomeration point can be accomplished by changing agitation speed during the reaction.

The following example illustrates a preferred manner of making the large particle size latex of this invention, all parts being by weight unless otherwise indicated.

EXAMPLE 1

The reaction was conducted in a 20-gallon pressure vessel having an inside diameter of 18 inches and being 23 inches deep and equipped with 3 evenly spaced baffles, each 1½ inches wide and 14½ inches long and 3/16 inch thick, spaced ½ inch from the side of the reactor; and equipped with two 8¼ inch diameter, flat blade turbine impellers having six evenly spaced 2 inch wide blades, one impeller spaced 1¾ inches from the bottom of the reactor and the other spaced 8¾ inches from the bottom of the reactor and rotated at 450 r.p.m. throughout the reaction. The following formula was charged to the reactor after the reactor was purged with butadiene vapors:

| Materials: | Parts |
|---|---|
| Water | 60 |
| Butadiene-1,3 | 70 |
| Styrene | 30 |
| (Total monomer charged—71.1 lbs.) | |
| Modifier (tertiary dodecyl mercaptan) | 0.1 |
| Tripotassium phosphate | 0.11 |
| Versene Fe-3 | 0.005 |
| Ferrous sulfate heptahydrate | 0.005 |
| Sodium formaldehyde sulfoxylate | 0.027 |
| Diisopropyl benzene hydroperoxide (50%) | 0.045 |
| Sodium hydrosulfite | 0.016 |
| Potassium oleate | 1.23 |

Temperature 60° F. ±10°.

The reaction was started at the time the catalyst was added to the reactor and the percent solids, pH, and surface tension were measured at the intervals listed below:

*Table 1*

| Reaction Time (Hours) | Conversion (percent) | pH | Surface Tension (dynes/cm.) |
|---|---|---|---|
| 2 | 3.1 | 10.35 | 33 |
| 4 | 9.6 | | 47 |
| 6 | 15.1 | 10.3 | 50 |
| 8 | 28.3 | | (1) |
| 10 | 32.4 | 10.4 | 67 |
| 12 | 37.6 | | 65 |
| 14 | 41.1 | 10.4 | 60 |
| 16 | 45.3 | | 57 |
| 18 | 49.7 | 10.3 | 54 |
| 20 | 49.7 | | 52 |
| 22 | 50.9 | 10.4 | 51 |
| 24 | 51.8 | | 51 |
| 26 | 52.9 | 10.5 | 29 |
| 28 | 52.9 | | 29 |
| 30 | | 10.4 | 29 |
| 32 | 53.3 | | 29 |
| 34 | 52.9 | 10.4 | 29 |
| 36 | 52.6 | | 29 |

1 Too thick to measure.

At the end of the reaction time the latex contained 33.8% solids which was readily concentrated to a total solids content of 73% which had a Brookfield viscosity of 500 cps., a final surface tension of 29 dynes per centimeter, and an estimated average particle size of 4,500 A. The Mooney plasticity (M/L-4) of the polymer was 150.5. As a measure of the desirable particle size distribution possessed by the latex of this example, the following Brookfield viscosities were recorded for the solids noted:

Percent solids @ Brookfield viscosity of 200 cps. @ 20 r.p.m. 68.4

Percent solids @ Brookfield viscosity of 500 cps. @ 20 r.p.m. 73.0

Percent solids @ Brookfield viscosity of 800 cps. @ 20 r.p.m. 75.0

Percent solids @ Brookfield viscosity of 1100 cps. @ 20 r.p.m. 76.3

The following formula was charged to a 5-gallon pressure reactor and polymerized under the conditions noted:

EXAMPLE 2

| Materials: | Parts |
|---|---|
| Water | 100 |
| Butadiene-1,3 | 70 |
| Styrene | 30 |
| (Total monomer charged—13 lbs.) | |

EXAMPLE 2—Continued

| Materials: | Parts |
|---|---|
| Tertiary dodecyl mercaptan | 0.10 |
| Tripotassium phosphate | 0.11 |
| Versene Fe-3 (sodium salt of ethylenediamine tetra-acetic acid) | 0.01 |
| Ferrous sulfate heptahydrate | 0.005 |
| Sodium formaldehyde sulfoxylate | 0.037 |
| Diisopropyl benzene hydroperoxide (50%) | 0.12 |
| Potassium oleate | 2.83 |
| Sodium hydrosulfite | 0.02 |

Temperature 60° F.

The 5-gallon reactor was equipped with agitator means comprising one 6 inch diameter 3 blade marine propeller and one 6 inch diameter Brumagim impeller mounted 6 inches apart on a shaft. The Brumagim had 3 equally spaced 3 inch arms mounted with 1½ inch square blades. The marine propeller was mounted on the end of the shaft 3 inches from the bottom of the reactor and the Brumagim was 4 inches below the surface of the reaction mixture. The blades of the Brumagims were at 90 degrees to the direction of rotation of the arms. The reactor had an inner diameter of 9¾ inches and was 15½ inches deep. Three equally spaced baffles 12 inches by 1 inch wide were mounted vertically in the reactor and ½ inch from the sides of the reactor. The agitation was 425 r.p.m. throughout the reaction. In Table 2 below are recorded the data obtained during the 26 hour reaction.

Table 2

| Reaction Time (Hrs.) | Surface Tension (dynes/cm.) | Conversion (percent) | pH | Total Soap (gm. K-oleate/100 gm. polymer) | No. of Particles/ml. $H_2O (\times 10^{14})$[1] | Ratio, Charged Soap/Total Soap |
|---|---|---|---|---|---|---|
| 2.25 | 46.5 | 12.3 | 9.6 | 32.8 | 1.84 | .704 |
| 3.15 | 54.6 | 21.0 | 9.8 | 26.5 | 2.12 | .528 |
| 4.50 | 60.0 | 30.3 | 9.7 | 21.4 | 1.75 | .441 |
| 5.75 | 54.6 | 37.5 | 9.7 | 13.6 | 0.526 | .556 |
| 6.58 | 51.5 | 41.2 | 9.6 | 11.4 | 0.302 | .599 |
| 7.58 | 46.3 | 43.9 | 9.6 | 8.7 | 0.149 | .740 |
| 9.00 | 42.1 | 45.8 | 9.9 | 7.5 | 0.0523 | .820 |
| 10.00 | 36.2 | 48.5 | 10.0 | 6.5 | 0.0478 | .895 |
| 14.00 | 33.6 | 53.0 | 9.9 | 5.7 | 0.0367 | .932 |
| 17.00 | 33.7 | 55.5 | 9.8 | 5.4 | 0.0462 | .950 |
| 26.00 | 32.7 | 60.3 | 10.1 | 4.7 | 0.0289 | 1.000 |

[1] Based on an assumption of uniform particle sizes from soap titrations.

During the reaction the latex agglomerated fully at 49.5% conversion and proceeded slowly up to 60% conversion. The resulting latex concentrated to a total solids of 66.4% with a Brookfield viscosity of 399 cps., a polymer hydrocarbon content of 95%, a final surface tension of 32.7 dynes per centimeter, and an average particle size of 3,000 A. The solids at 500 cps. Brookfield viscosity was estimated at 67.4%

In the foregoing example the 60° F. temperature was easily controlled throughout the reaction. The same control was experienced when as little at 75 parts of water were used.

It is interesting to examine the data listed in the table above, particularly with respect to the mechanism of agglomeration. The sharp rise of the surface tension to a maximum and the subsequent drop of the surface tension to a minimum during the reaction indicates that agglomeration has proceeded to a satisfactory degree and the major portion, if not all, of the agglomeration occurred in about 10 to 16 hours of the total reaction time.

The remainder of the total reaction time was concerned with continuing the conversion to the highest possible level but at a greatly reduced reaction rate. While the surface tension change was abrupt for this polymerization as indicated by the data in the table above, it did not, however, drop instantaneously indicating that the agglomeration was dependent upon time. It is believed that the initiated particles grew until they reached a size wherein the soap present could no longer adequately stabilize all of the particles; this would be represented by the peak of surface tension which coincides with the minimum in ratio of charged soap to that of soap required to saturate the surface of the particles. These particles were now in a condition favorable for agglomeration. This agglomeration then caused a decrease in the number of particles, which explains the reduced reaction rate. The ability to bring about the desired degree of agglomeration at conversion levels as high as 60% within a total reaction time of from 20 to 30 hours has been discovered to be dependent upon the use of less than 3 parts of a surfactant per 100 parts of monomer and the use of optimal agitation means to produce an emulsion having monomer droplets with a total surface area sufficient to use only a certain amount of the total soap. Under these conditions enough soap micelles remain to permit the rapid conversion of monomer to polymer until at least about 40% of the monomer has been converted to polymer. Enough soap is present to stabilize the latex particles until the desired conversion is reached but not enough to prevent agglomeration of the particles at this conversion.

The following example illustrates a method of making the high solids later of this invention by employing variable speed agitation during the polymerization.

EXAMPLE 3

The reaction was conducted in a 20-gallon pressure vessel having an inside diameter of 18 inches and being 23 inches deep and equipped with 3 evenly spaced baffles, each 1½ inches wide and 14½ inches long and 3/16 inch thick, spaced ½ inch from the side of the reactor; and equipped with 3 sets of equally spaced 8 inch diameter 15 degree Brumagim impellers mounted on a shaft rotating centrally of the reactor. The blades of the bottom set were 1 inch by 1⅝ inch and spaced 1¾ inch from the bottom of the reactor. The blades of the two upper sets were 1 inch by 2½ inch with the upper set being spaced 1¾ inches below the surface of the reactor mixture. The following formula was charged to the reactor.

| Materials: | Parts |
|---|---|
| Water | 80 |
| Butadiene-1,3 | 70 |
| Styrene | 30 |
| (Total monomer charged—71.1 lbs.) | |
| Tertiary dodecyl mercaptan | 0.1 |
| Tripotassium phosphate | 0.11 |
| Versene Fe-3 | 0.0075 |
| Ferrous sulfate heptahydrate | 0.005 |
| Sodium formaldehyde sulfoxylate | 0.037 |
| Diisopropyl benzene hydroperoxide (50%) | 0.061 |
| Sodium hydrosulfite | 0.016 |
| Potassium oleate | 1.23 |

Temperature 41 to 58° F.

The reaction mixture was cooled to 41° F. and then the reaction was started with the addition of the diisopropyl benzene hydroperoxide. The initial agitation was 450 r.p.m. and when 46% of the monomer was converted to polymer the agitation was increased to 550 r.p.m. The data listed in Table 3 below were obtained during this polymerization:

Table 3

| Reaction Time (Hours) | Conversion (Percent) | Surface Tension (dynes/cm.) | Temperature (° F.) |
|---|---|---|---|
| 2 | 12.6 | | 41 |
| 4 | 20.5 | 58.7 | 41 |
| 6 | 28.1 | 68.4 | 41 |
| 8 | 30.3 | 68.7 | 41 |
| 10 | | (¹) | 41 |
| 12 | 36.8 | (¹) | 41 |
| 14 | | (¹) | 41 |
| 16 | 44.0 | (¹) | 41 |
| 18 | 48.2 | 60.9 | 58 |
| 20 | 49.7 | 61.0 | 51 |
| 22 | 51.5 | 58.3 | 45 |
| 24 | 52.7 | 45.0 | 49 |
| 26 | 52.9 | 41.9 | 50 |
| 28 | 53.6 | 40.5 | 50 |
| 30 | | 40.0 | 51 |
| 32 | 56.0 | 40.0 | 51 |

¹ Undiluted latex too thick to measure.

The final latex was concentrated to a solids content of 71.5% having a Brookfield viscosity of 1690 cps., a pH of 10.4, a polymer Mooney plasticity (M/L-4) of 119.5, and an average particle size of 3,500 A.

The following example illustrates how the large particle size latex of this invention may be made in a large reaction vessel having a capacity of 3750 gallons.

EXAMPLE 4

The preparation of this latex was conducted in a 3750-gallon glass lined reaction vessel which had an inside diameter of 90 inches. The height was 8 feet 5 inches on the straight side and 13 feet from nozzle to nozzle at the top and bottom of the dish-shaped ends of the reactor. The reactor was cooled by an exterior jacket and in addition cooled by internal coils. The coils were arranged in 4 evenly spaced banks comprising twenty-four 1½ inch diameter tubes in each bank. The tubes were spaced on 3 inch centers allowing the passage of the latex between the coils. Each bank of coils was 108 inches long and 20 inches wide. The agitator speed was controlled from 0 to 285 r.p.m. by a variable speed hydraulic drive unit. This drive operated an agitator having 3 sets of 3 evenly spaced arms carrying a Brumagim blade which swept in a circle 36 inches in diameter, each blade being 5 inches wide and 16 inches long and having an approximate pitch of 13 degrees. The blades rotated in a manner to throw the latex radially outwardly from the blades. The arms were positioned on the drive shaft so that the bottom set was 14 inches from the bottom of the dish, the middle set was 53 inches from the bottom of the dish, and the top set was 92 inches from the bottom of the dish. Each blade was mounted at the end of its corresponding arm so that its longest dimension was parallel with the longest dimension of the reactor while the shorter dimension of the blade was set at a pitch of 13 degrees with the line of rotation causing the outward movement of the latex from the blade to the shell of the reactor, the upper portion flowing upward then inward toward the eye of the impeller and the lower portion flowing downward then inward toward the eye of the impeller.

The following recipe was charged to the reactor:

| Material: | Parts |
|---|---|
| Water | 80 |
| Butadiene-1,3 | 70 |
| Styrene | 30 |
| (Total monomer charged—12,000 lbs.) | |
| Tertiary dodecyl mercaptan | 0.10 |
| Tripotassium phosphate | 0.11 |
| Versene Fe-3 | 0.0133 |
| Ferrous sulfate heptahydrate | 0.00092 |
| Sodium formaldehyde sulfoxylate | 0.0576 |
| Diisopropyl benzene hydroperoxide (50%) | 0.059 |
| Potassium oleate | 1.23 |
| Sodium hydrosulfite | 0.016 |

Temperature 41° F.

All materials with the exception of the diisopropyl benzene hydroperoxide were charged to the reactor. The agitator was set to rotate at 80 r.p.m. and the mixture cooled to 41° F. at which time the diisopropyl benzene hydroperoxide was added.

The following data were obtained during the reaction:

| Reaction Time (Hours) | Conversion (Percent) | Surface Tension (dynes/cm.) | Agitator Speed (r.p.m.) |
|---|---|---|---|
| 7 | 10 | 46 | 80 |
| 10 | 15 | 49 | 80 |
| 13 | 20 | 52 | 80 |
| 18 | 25 | 59 | 80 |
| 21 | 30 | 70 | 140 |
| 22 | 32 | (¹) | 140 |
| 23 | 34 | (¹) | 140 |
| 24.5 | 36 | (¹) | 140 |
| 25 | 38 | (¹) | 140 |
| 25.5 | 40 | (¹) | 140 |
| 26 | 42 | (¹) | 140 |
| 28 | 44 | (¹) | 140 |
| 29 | 45 | (¹) | 140 |
| 30 | 46 | 65 | 140 |
| 32 | 47 | 64 | 140 |
| 33 | 48 | 63 | 140 |
| 34 | 49 | 62 | 140 |
| 35 | 50 | 61 | 140 |
| 36 | 51 | 60 | 140 |
| 37 | 52 | 56 | 180 |
| 38 | 52 | 55 | 180 |
| 39 | 52 | 50 | 180 |
| 39.25 | 52.3 | 29 | 180 |

¹ Undiluted latex too thick to measure.

The polymerization was reacted to 52.3% conversion in 39.25 hours. The final latex had a surface tension of 29.3 dynes per centimeter, and the rubber hydrocarbon content was 96%. The average particle size of the latex was estimated at about 4,500 A.

EXAMPLE 5

This example shows a way of making the latex of the present invention continuously. A group of nine 5-gallon reactor vessels were connected in series, the first of which was charged continuously by pumping the polymerization ingredients of the following recipe into the bottom of the first reactor.

| Material: | Parts |
|---|---|
| Water | 80 |
| Potassium oleate | 2.0 |
| Tripotassium phosphate | 0.11 |
| Versene Fe-3 | 0.0175 |
| Ferrous sulfate heptahydrate | 0.0085 |
| Sodium formaldehyde sulfoxylate | 0.05 |
| Diisopropyl benzene hydroperoxide (50%) | 0.150 |
| Butadiene-1,3 | 70 |
| Styrene | 30 |
| (Total monomer charged—22 lbs. every 2.4 hours) | |
| Tertiary dodecyl mercaptan | 0.02 |
| Sodium hydrosulfite | 0.02 |

Each of the 9 reactors was 10 inches inside diameter and 15 inches deep measured from the bottom of the dish-shaped lower end to the lip at the upper end of the reactor. Each reactor was cooled by an exterior jacket. Each reactor was provided on the inside with 3 evenly spaced baffles ¾ inch wide and 10 inches long spaced ½ inch from the side of the reactor. The agitation for each of these reactors was provided by variable speed hydraulic drives which may be controlled from 0 to 600 r.p.m. Each drive operated 2 sets of Brumagim impellers each comprising 3 evenly spaced arms carrying a Brumagim blade. The blades in the first 4 reactors were 2 inches wide and 3 inches high and set at a 30 degree angle to the tangent of the direction of rotation and sweeping in a circle 6 inches in diameter. The blades in the next 4 reactors were 2 inches wide and 2½ inches high and set at 45 degrees and sweeping in a circle 6 inches in diameter. The blades in the last reactor were 2 inches square set at 90 degrees and sweeping in a circle 5 inches in diameter.

The lower set of the 2 sets in each reactor was spaced 3 inches from the bottom of the dish portion of the reactor and the top set in each reactor was positioned 10 inches from the bottom of the dish of the reactor.

The temperature and rate of rotation of the Brumagim impellers in each reactor are listed as follows:

| Reactor | R.p.m. | Temperature (° F.) |
|---|---|---|
| 1 | 270 | 41 |
| 2 | 285 | 45 |
| 3 | 300 | 50 |
| 4 | 350 | 50 |
| 5 | 370 | 55 |
| 6 | 390 | 55 |
| 7 | 420 | 60 |
| 8 | 520 | 60 |
| 9 | 600 | 70 |

The flow of the ingredients through the reactors proceeded from the bottom of the first reactor to the top thereof and then to the top of the second reactor to the bottom thereof, which direction of flow was then repeated through the remaining reactors. The flow from the top of the ninth reactor then proceeded to a 65-gallon vacuum vessel where the unreacted butadiene-1,3 was flashed off. A back pressure of 40 pounds was maintained on the system to prevent vaporization of the butadiene from the chain.

It took a period of approximately 2.4 hours for the ingredients to pass from the bottom of one reactor to the top of the same reactor and a total reaction time of 21.6 hours to pass through the system of nine reactors. The system was run continuously for 624 hours. The percent conversion and the surface tension were measured on the latex leaving reactors 2, 4, 6, 8, and 9 at 3 hour intervals. During a 24 hour period the percent conversion at these points of sampling was 30, 40, 48, 52, and 52, respectively, each value being the average of 8 separate readings. The surface tension, measured at the same points, was 61, 66, 56, 42, and 36, respectively, each value being the average of 8 separate readings.

A short-stop comprising 0.3 part of potassium dimethyl dithiocarbamate was added to the 65-gallon vacuum vessel and thoroughly mixed into the latex. After the unreacted butadiene and styrene was removed from the latex, the resulting stripped latex was concentrated by evaporating water therefrom to a solids content of 69.5% having a Brookfield viscosity of 500 cps. using a No. 2 spindle at 20 r.p.m., a surface tension of 36.4 dynes per centimeter, and a Mooney plasticity (M/L-4) of 111 for the polymer.

By the term "agglomeration" as used throughout the specification and claims is meant the fusion or coalescence of many individual small latex particles, having a large total surface area, into a new larger diameter latex particle having a greatly reduced total surface area. The number of individual small particles agglomerating to form a new particle may vary anywhere from a small number to many thousand, thus accounting for the large distribution of particle sizes in the agglomerated latex. The particle sizes of the agglomerated latex range from about 500 A. to 50,000 A. This large distribution of particle sizes accounts for the desirable viscosity values at high solids content possessed by the latices of this invention. It may be visualized that when the latex of this invention is concentrated to increase the solids content the particles pack more closely together and therefore more fully fill a unit space with more solids than is otherwise possible when the particles are of a more uniform particle size.

All average particle size data were obtained from either calculations based upon soap titrations and/or calculations of soap coverage on the surface of the latex particle as outlined in an article by Maron et al. appearing in the "Journal of Colloid Science," 9, 104 (1954). This method of determining average particle size is, however, considered inadequate for measuring the actual average particle size of the latices of this invention because from observations under the light microscope numerous particles are present in the range of 10,000 A. to 50,000 A. Therefore, the actual average particle size must necessarily be much larger than present methods are capable of measuring.

The Brookfield viscosity measurements reported herein were obtained using the speeds and spindles as recommended by the manufacturer of the instrument.

The surface tension is an indirect measurement of the condition of the polymerization system. For example, when the surface tension curve approaches a maximum or constant value, the operator knows that his polymerization system is ready to be agglomerated as by increasing the agitation of his system. When the curve dips rapidly from its upper limit to a lower value, the operator knows that he is successfully agglomerating his latex. The operator also knows how rapidly the system is agglomerating by the rate at which the surface tension decreases from the maximum value and he is also informed of the degree of the agglomeration or the extent to which agglomeration has taken place by the value to which the surface tension decreased.

The process of the present invention permits the operator to adjust the conditions noted in the examples to such a degree that the degree of agglomeration can also be controlled, thus providing for the first time a method for controlling the particle size of a latex through the careful control of a limited amount of surfactant and by means of agitation. The lower the curve descends the more nearly complete is the agglomeration. Thus, surface tension values in the vicinity of 27 dynes per centimeter represents complete agglomeration for a given system, whereas values progressively greater and approaching the maximum surface tension possessed by the system represent progressively less agglomeration or partial agglomeration. This relationship between complete agglomeration and maximum particle size becomes evident when it is understood that the greater the number of small particles that combine or agglomerate, the fewer and larger in size will be the agglomerated particles that are formed. Therefore, they will have a reduced total surface which needs less soap to stabilize them, thus releasing more soap to the aqueous phase to cause a decrease in surface tension.

The latex of the present invention is particularly useful in the manufacture of foamed rubber products and particularly as a replacement for natural rubber latex normally used in making foamed rubber products.

While certain representative embodiments and details have been shown for the purpose of illustrating the invention, it will be apparent to those skilled in this art that various changes and modifications may be made therein without departing from the spirit or scope of the invention.

What is claimed is:

1. In the process of preparing a rubbery polymeric latex having large size latex particles by polymerizing a polymerizable conjugated diene monomer while dispersed in an aqueous emulsion containing from 50 to 150 parts of water per 100 parts of monomer, a micelle producing surfactant, and a free radical initiator, at a polymerization temperature of from about 40° F. to about 85° F. and forming a rubbery latex particle in which the monomer is soluble, the improvement which comprises dispersing the monomer and sufficient surfactant in the water to form micelles to promote the conversion of monomer to polymer at an average rate of at least about 2% per hour during at least up to 40% conversion of monomer to polymer and stabilize the resulting latex particles during said conversion period but insufficient to prevent the surface tension of the system from increasing to a maximum value during polymerization and then decreasing to a minimum value during agglomeration when at least 40% of monomer has been converted to polymer, polymerizing the monomer to polymer and increasing the surface tension of the system and treating the latex particles with agitation to cause agglomeration of the latex particles and a decrease of the surface tension when at least 40% of monomer has been converted to polymer in the presence of the surfactant initially charged as the total surfactant used, removing unreacted monomer from the agglomerated latex and recovering the latex.

2. The process of claim 1 in which the polymerizable monomer is butadiene-1,3.

3. The process of claim 2 in which styrene is copolymerized with butadiene-1,3.

4. The process of claim 3 in which the surfactant is potassium oleate present in an amount not greater than 3 parts.

5. The process of claim 4 in which the polymerization temperature is about 41° F.

6. The process of claim 5 in which about 80 parts of water are used.

7. The process of claim 6 in which the surface tension of the system reaches a maximum value of about 50 to 70 dynes per centimeter.

8. The process of claim 7 in which the surface tension decreases to a value of between about 27 to 35 dynes per centimeter.

9. In the process of preparing a rubbery polymeric latex having large size latex particles by polymerizing a polymerizable, conjugated diene monomer while dispersed in an aqueous emulsion containing from 50 to 150 parts of water per 100 parts of monomer, a micelle producing surfactant, and a free radical initiator, at a polymerization temperature of from about 40° F. to about 85° F. and forming a rubbery latex particle in which the monomer is soluble, the improvement which comprises dispersing the monomer and sufficient surfactant in the water to form micelles to promote the conversion of monomer to polymer at an average rate of from about 2 to 5% per hour during at least up to 40% conversion of monomer to polymer and stabilize the resulting latex particles when at least 40% of the monomer has been polymerized but insufficient to prevent the surface tension of the system from increasing to a maximum value during polymerization and then decreasing for the first time to a minimum value when at least 40% of the monomer has been converted to polymer, polymerizing the monomer to form latex particles and increasing the surface tension of the system to a maximum value and treating the resulting latex with agitation to cause agglomeration of the latex particles and for the first time a sharp decrease in the surface tension of the emulsion to a value which remains substantially below said maximum value in the presence of the surfactant initially charged as the total surfactant used removing unreacted monomer from the agglomerated latex and recovering the latex.

10. In the process of preparing a rubbery polymeric latex having large size latex particles by polymerizing a polymerizable, conjugated diene monomer while dispersed in an aqueous emulsion containing from 50 to 150 parts of water per 100 parts of monomer, a micelle producing surfactant, and a free radical initiator, at a polymerization temperature of from about 40° F. to about 85° F. and forming a rubbery latex particle in which the monomer is soluble, the improvement which comprises dispersing the monomer and sufficient surfactant in water to form micelles to promote the conversion of monomer to polymer at an average rate of at least 2% per hour during at least up to 40% conversion of monomer to polymer and stabilizing the resulting latex particles but insufficient to cover not more than about 30% to 45% of the total surface of latex particles when at least 40% of monomer has been converted to polymer, polymerizing the monomer to polymer in the presence of the surfactant initially charged as the total surfactant used to increase the surface tension of the system to a value of at least 50 dynes per centimeter when at least 40% of monomer has been converted to polymer and treating the resulting latex with agitation to cause agglomeration of the latex particles and a decrease in surface tension to a value below about 40 dynes per centimeter, removing unreacted monomer from the agglomerated latex and recovering the latex.

11. In the process of preparing a rubbery polymeric latex having large size latex particles by polymerizing a polymerizable, conjugated diene monomer while dispersed in an aqueous emulsion containing from 50 to 150 parts of water per 100 parts of monomer, a micelle producing surfactant, and a free radical initiator, at a polymerization temperature of from about 40° F. to about 85° F. and forming a rubbery latex particle in which the monomer is soluble, the improvement which comprises dispersing the monomer and sufficient surfactant in the water to form micelles to convert the monomer to polymer at a rate of at least 2% per hour until at least 40% of monomer has been converted to polymer and stabilize the resulting latex particles against agglomeration when at least 40% of the monomer has been converted to polymer but insufficient to prevent an increase in surface tension to a value of between about 50 to 70 dynes per centimeter during which time the latex particles approach a condition where they readily agglomerate, polymerizing the monomer to polymer in the presence of the surfactant initially charged as the total surfactant used until the surface tension of the system achieves a value between about 50 to 70 dynes per centimeter when at least 40% of the monomer has been converted to polymer and then treating the resulting latex with agitation to cause agglomeration of the latex particles and a sharp decrease in the surface tension of the system to a value approaching the value possessed by the system just prior to polymerization, removing unreacted monomer from the agglomerated latex and recovering the latex.

12. In the process of preparing a rubbery polymeric latex having large size latex particles by polymerizing a polymerizable, conjugated diene monomer while dispersed in an aqueous emulsion containing from 50 to 150 parts of water per 100 parts of monomer, a micelle producing surfactant, and a free radical initiator, at a polymerization temperature of from about 40° F. to about 85° F. and forming a rubbery latex particle in which the monomer is soluble, the improvement which comprises dispersing the monomer and sufficient surfactant in the water to form micelles to promote the conversion of monomer to polymer at an average rate of at least about 2% per hour during at least up to 40% conversion of monomer to polymer and stabilize the resulting latex particles during said conversion period but insufficient to prevent the surface tension of the system from increasing to a maximum value during polymerization and then decreasing to a minimum value during agglomeration when at least 40% of monomer has been converted to polymer, polymerizing the monomer to polymer in the presence of the surfactant initially charged as the total surfactant used while agitating the system and increasing the surface tension of the system and changing the agitation of the system to cause agglomeration of the latex particles and a decrease of the surface tension when at least 40% of monomer has been converted to polymer, removing unreacted monomer from the agglomerated latex and recovering the latex.

13. In the continuous process of preparing a rubbery polymeric latex having large size latex particles by polymerizing a polymerizable conjugated diene monomer while dispersed in an aqueous emulsion containing from 50 to 150 parts of water per 100 parts of monomer, a micelle producing surfactant, and a free radical initiator, at a polymerization temperature of from about 40° F. to about 85° F. and forming a rubbery latex particle in which the monomer is soluble, the improvement which comprises continuously dispersing the monomer and sufficient surfactant in the water to form micelles to promote the continuous conversion of monomer to polymer at an average rate of at least about 2% per hour during at least up to 40% conversion of monomer to polymer and stabilize the resulting latex particles during said conversion period but insufficient to prevent the surface tension of the system from increasing to a maximum value during polymerization and then decreasing to a minimum value during agglomeration when at least 40% of monomer has been converted to polymer, continuously polymerizing the monomer to polymer and increasing the surface tension of the sytsem and treating the latex particles wtih agitation to cause agglomeration of the latex particles and a decrease of the surface tension when at least 40% of monomer has been converted to polymer in the presence of the surfactant initially charged as the total surfactant used, continuously withdrawing the agglomerated latex and then removing the unreacted monomer and recovering the latex.

14. The process of preparing a rubbery polymeric latex having a polymer hydrocarbon content of at least 94% of the total solids and a solids of at least 68% and a Brookfield viscosity of less than about 2,000 cps. which comprises polymerizing a polymerizable conjugated diene monomer in an aqueous emulsion containing 50 to 150 parts of water per 100 parts of monomer, a free radical initiator to promote polymerization of the monomer at a temperature of from about 40° F. to about 85° F. in the presence of sufficient micelle producing surfactant initially charged as the total surfactant used to promote the conversion of monomer to polymer at an average rate of at least 2% per hour during at least up to 40% conversion of monomer to polymer and stabilize the resulting latex particles but insufficient to prevent the surface tension of the system from increasing to a value higher than possessed by the system at the start of polymerization and then decreasing to a substantially lower value when at least 40% of monomer has been converted to polymer, treating the resulting latex particles with agitation to agglomerate the latex particles when at least 40% of monomer has been converted to polymer, removing unreacted monomer from the agglomerated latex and recovering the latex.

15. The process of preparing a rubbery polymeric latex having a polymer hydrocarbon content of at least 94% of the total solids and solids of at least 68% and a Brookfield viscosity of less than about 2,000 cps. which comprises polymerizing a polymerizale conjugated diene monomer in an aqueous emulsion containing 50 to 150 parts of water per 100 parts of monomer, a free radical initiator to promote polymerization of the monomer at a temperature of from about 40% F. to about 85° F. in the presence of sufficient micelle producing surfactant initially charged as the total surfactant used to promote the conversion of monomer to polymer at an average rate of at least 2% per hour during at least up to 40% conversion of monomer to polymer and stabilize the resulting latex particles but insufficient to prevent the surface tension of the system from increasing to a value higher than possessed by the system just prior to polymerization and then decreasing, at a rate faster than the surface tension increased, to a substantially lower value when at least 40% of monomer has been converted to polymer while treating the system prior to polymerization with agitation at a rate sufficient to produce the desired number of micelles and then increasing the rate of agitation during polymerization sufficiently to cause said change in surface tension through a maximum to a minimum value and agglomeration of the latex particles when at least 40% of monomer has been converted to polymer, removing unreacted monomer from the agglomerated latex and recovering the latex.

16. The process of preparing a rubbery polymeric latex having a polymer hydrocarbon content of at least 94% of the total solids and a solids of at least 68% and a Brookfield viscosity of less than 2,000 cps. which comprises polymerizing a polymerizable conjugated diene monomer in an aqueous emulsion containing 50 to 150 parts of water per 100 parts of monomer, a free radical initiator to promote polymerization of the monomer at a temperature of from about 40° F. to about 85° F. in the presence of sufficient micelle producing surfactant initially charged as the total surfactant used to promote the conversion of monomer to polymer at an average rate of at least 2% per hour during at least up to 40% conversion of monomer to polymer and stabilize the resulting latex particles but not more than 3 parts of surfactant per 100 parts of monomer, treating the resulting latex particles with agitation to agglomerate the latex particles when at least 40% of monomer has been converted to polymer, removing unreacted monomer from the agglomerated latex and recovering the latex.

17. A continuous process of preparing a rubbery polymeric latex having a polymer hydrocarbon content of at least 94% of the total solids and a total solids of at least 68% and a Brookfield viscosity of less than about 2,000 cps. which comprises continuously polymerizing in a series of reactors a polymerizable conjugated diene monomer in an aqueous emulsion containing 50 to 150 parts of water per 100 parts of monomer, a free radical initiator to promote polymerization of the monomer to polymer at a temperature of from about 40° F. to about 85° F. and sufficient micelle producing surfactant initially charged as the total surfactant used to initiate polymerization in the first reactor of the series and promote the conversion of monomer to polymer at an average rate of at least 2% per hour during at least up to 40% conversion of monomer to polymer and stabilize the resulting latex particles but insufficient to prevent the surface tension of the system from increasing to a value higher in the subsequent reactors then possessed by the system in the first reactor, and then decreasing to a substantially lower value in the remaining reactors when at least 40% of monomer has been converted to polymer while agitating the system under variable conditions of agitation and temperature sufficiently to insure said rate and amount of conversion and then cause agglomeration of the latex particles, continuously withdrawing the agglomerated latex from the last reactor of said series, removing unreacted monomers, and recovering the latex.

References Cited in the file of this patent

UNITED STATES PATENTS

| | | |
|---|---|---|
| 2,579,908 | Davison et al. | Dec. 25, 1951 |
| 2,897,168 | Brown | July 28, 1959 |

FOREIGN PATENTS

| | | |
|---|---|---|
| 758,622 | Great Britain | Oct. 3, 1956 |

OTHER REFERENCES

Whitby: "Synthetic Rubber," John Wiley & Sons, New York, N.Y., 1954, chapter 19, pages 649–665.